(12) United States Patent
Sagar

(10) Patent No.: US 7,262,715 B2
(45) Date of Patent: Aug. 28, 2007

(54) BIT STUFFING METHOD AND APPARATUS FOR FAX AND OTHER DATA COMMUNICATION

(75) Inventor: Raghavendra P. Sagar, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 10/334,435

(22) Filed: Dec. 31, 2002

(65) Prior Publication Data

US 2004/0150860 A1 Aug. 5, 2004

(51) Int. Cl.
 *H03M 5/00* (2006.01)

(52) U.S. Cl. ................................. 341/55; 341/106

(58) Field of Classification Search ............. 341/106, 341/50, 55, 63
See application file for complete search history.

(56) References Cited

U.S. PATENT DOCUMENTS

| 6,054,942 A | * | 4/2000 | Stemmler ................. 341/58 |
| 6,707,396 B2 | * | 3/2004 | Govindaraman ............. 341/50 |
| 2002/0093978 A1 | * | 7/2002 | Anantharaman et al. .... 370/466 |
| 2003/0063018 A1 | * | 4/2003 | Warren et al. ............ 341/68 |

* cited by examiner

*Primary Examiner*—Peguy JeanPierre
(74) *Attorney, Agent, or Firm*—Buckley, Maschoff & Talwalkar LLC

(57) ABSTRACT

According to some embodiments, a bit stuffing method is provided for fax and other data communication.

16 Claims, 7 Drawing Sheets

| SERIAL NUMBER 502 | CURRENT ONES COUNTER 504 | ORIGINAL BIT PATTERN 506 | NUMBER OF DATA BITS IN MODIFIED BIT PATTERN 508 | UPDATED ONES COUNTER 510 | MODIFIED BIT PATTERN 512 |
|---|---|---|---|---|---|
| 1 | 000 | 0000 | 100 | 000 | 00000 |
| 2 | 000 | 0001 | 100 | 001 | 00001 |
| 3 | 000 | 0010 | 100 | 000 | 00010 |
| ⋮ | | | | | |
| 64 | 011 | 1111 | 101 | 010 | 11011 |
| ⋮ | | | | | |
| 96 | 101 | 1111 | 101 | 100 | 01111 |

FIG. 5

BIT STUFFING METHOD AND APPARATUS FOR FAX AND OTHER DATA COMMUNICATION

BACKGROUND

A device may examine, and perhaps modify, an original series of data bits. For example, an original series of data bits might be examined to determine if the series includes a predetermined pattern of data bits. If the pre-determined pattern of data bits is found, the original series can be modified (i.e., such that the modified series of data bits does not include the pre-determined pattern).

Consider, for example, FIG. 1 which illustrates a known system 100 including a transmitter 110. In this case, the transmitter 110 has an original series of data bits 120 to be provided to a receiver 130 (e.g., via a communication network). According to some protocols, the transmitter inserts a flag pattern 140 before and after the original series of data bits 120 before the information is transmitted to the receiver 130. By way of example, "0111 1110" flag patterns 140 are inserted before and after the original series of data bits 120 in accordance with the High Level Data Link Control (HDLC) protocol as defined by document International Organization for Standardization/International Electro-technical Commission (ISO/IEC) 13239 (2002). Note that other information may also be added to the original series of data bits 120. For example, the original series of data bits 120 might comprise a Service Data Unit (SDU) or a Protocol Data Unit (PDU) that includes HDLC header and trailer information. The receiver 130 then recognizes and removes the flag patterns 140 from the received series of data bits.

If the original series of data bits 120 happens to include the exact same pattern as the flag pattern 140, however, the receiver 130 could mistakenly interpret the received information (e.g., the receiver 130 might view the un-intentional flag pattern as an indication that the original series of data bits has ended).

To avoid this problem, the transmitter 110 can perform a "bit stuffing" operation on the original series of data bits 120. In the case of HDLC, for example, the transmitter 110 examines the original series of data bits 120 to determine if it includes five consecutive one bits (i.e., "11111"). If this pattern is found, the original series is modified by inserting an extra zero after the fifth one bit. The modified series of data bits 150 is then transmitted to the receiver 130. As a result, six consecutive one bits will not occur within the modified series of data bits 150. The receiver 130 then performs the reverse operation (i.e., removing any zero that is detected after five consecutive one bits) to re-create the original series of data bits 120.

FIG. 2 is a flow chart of a known method to perform such a bit stuffing operation. At 202, a ones counter is initialized to zero and the next data bit in the original series is determined at 204. If this data bit is not a one 206 (i.e., it is a zero), no additional zero is inserted at 208 and the process continues at 202 (and the ones counter is re-initialized to zero).

If the data bit is a one at 206, the ones counter is incremented at 210. If the ones counter does not equal five at 212 (i.e., five consecutive ones have not yet been encountered), no additional zero is inserted at 214 and the process continues at 204 (without re-initializing the ones counter). If the ones counter does equal five at 212 (i.e., five consecutive ones have now been encountered), an additional zero is inserted into the modified series of data bits at 216. The process then continues at 202 (and the ones counter is re-initialized to zero).

This bit-by-bit approach to examining an original series of data bits, however, can be time consuming and may consume a significant number of processing cycles. Moreover, the code required to perform these bit-by-bit operations can be application specific. For example, it can be difficult to modify bit stuffing code designed for one type of processor such that it can be efficiently used by another type of processor. Similarly, bit stuffing code associated with a particular protocol (e.g., code that looks for five consecutive ones in accordance with the HDLC protocol) cannot be easily modified for use with another protocol.

BRIEF DESCRIPTION OF THE DRAWINGS

FIG. 5 illustrates entries in a look-up table according to some embodiments.

DETAILED DESCRIPTION

Some embodiments described herein are associated with a "series of data bits." As used herein, a "series of data bits" may be associated with, for example, a carrier-class, digital system-on-a-chip that employs Voice over Packet (VoP) technology to deliver voice, fax, and other data communications over an analog Public Switched Telephone Network (PSTN). Moreover, a series of data bits may be associated with the HDLC protocol, or any other protocol, and may be used to transmit information via voice, fax, and other data over packet networks.

Bit Stuffing Unit

Figure 1:
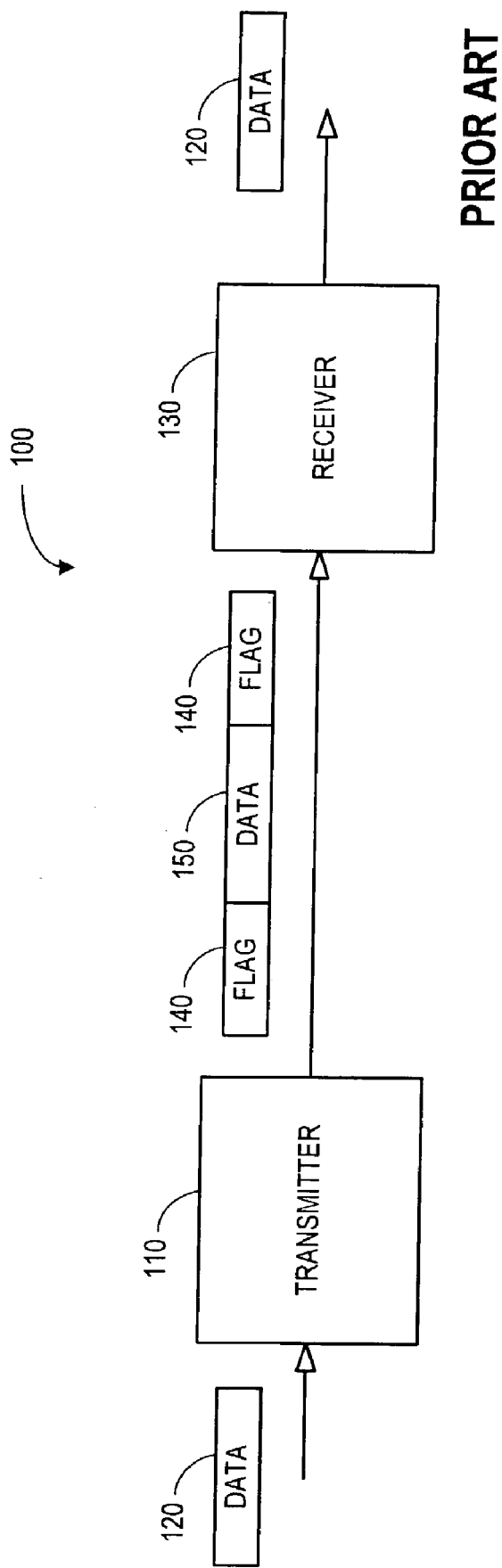
FIG. 1 is an illustration of a known system including a transmitter.
Figure 2:
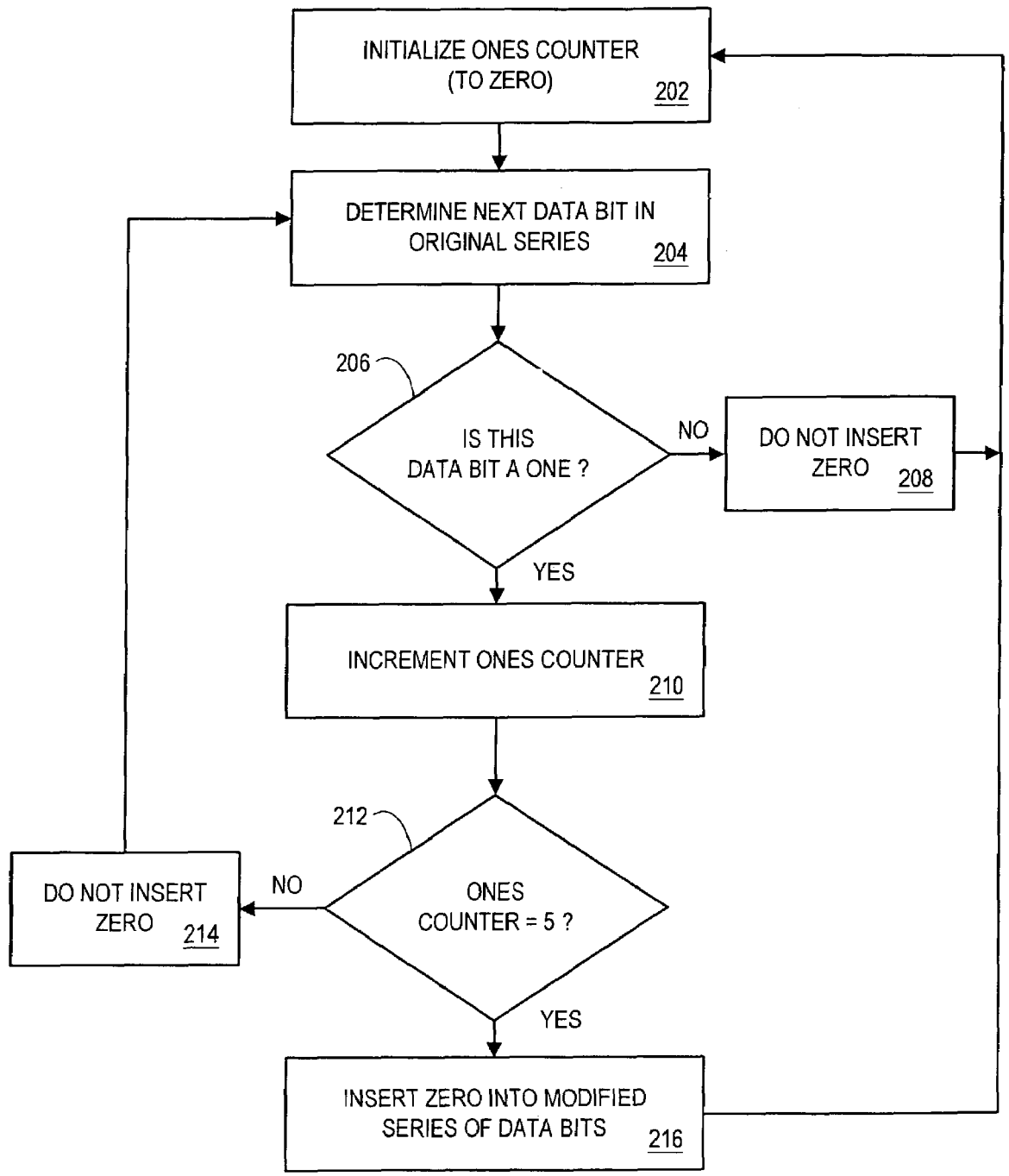
FIG. 2 is a flow chart of a known bit stuffing method.
Figure 3:
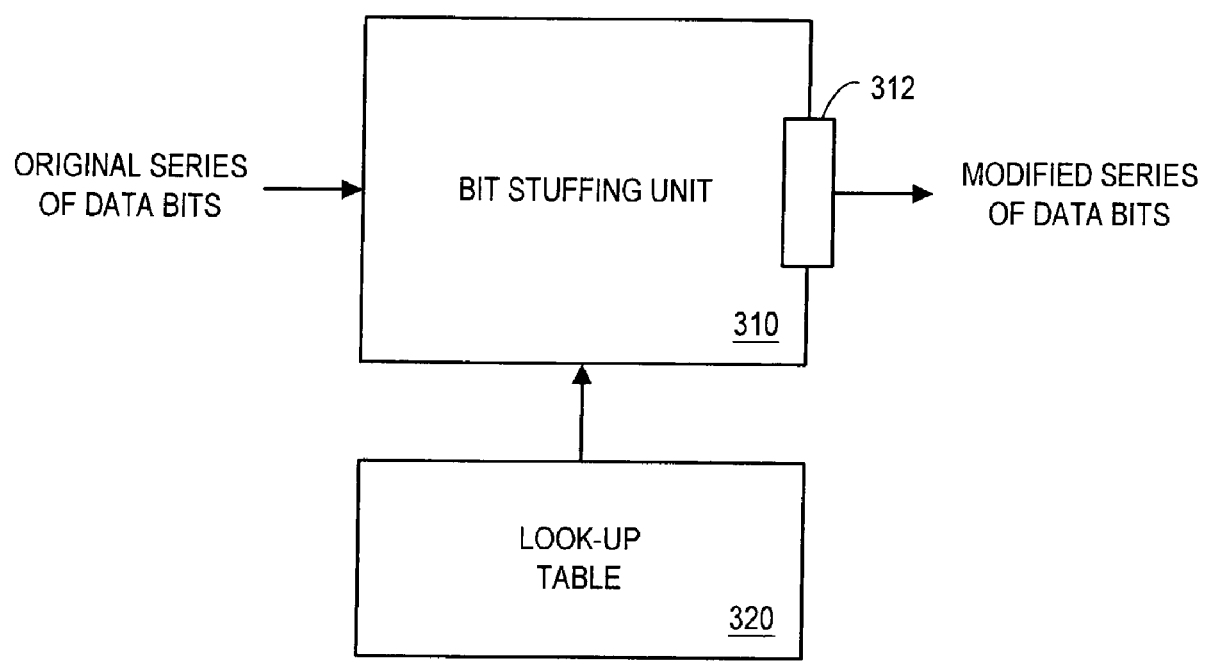
FIG. 3 is a block diagram including a bit stuffing unit according to some embodiments.

FIG. 3 is a block diagram including a bit stuffing unit 310 according to some embodiments. The bit stuffing unit 310 may be associated with, for example, a transmitter. According to this embodiment, the bit stuffing unit 310 can access a look-up table 320. The look-up table 320 may, for example, be stored in a storage device such as a Read Only Memory (ROM), Programmable ROM (PROM), or Erasable PROM (EPROM) device.

The bit stuffing unit 310 determines an original series of data bits (e.g., by receiving the information from another processor associated with the transmitter). The bit stuffing unit 310 then modifies the original series of data bits based on information in the look-up table 320 as indexed by a plurality of data bits in the original series. The bit stuffing unit may further include an output port 312 to transmit the modified series of data bits (e.g., via an analog communications network).

The bit stuffing unit 310 may, for example, prevent a pre-determined pattern of data bits from occurring in a modified series of data bits. The pre-determined pattern of bits may comprise, for example, a flag pattern such as an HDLC flag pattern (i.e., "0111 1110").

Bit Stuffing Method

Figure 4:
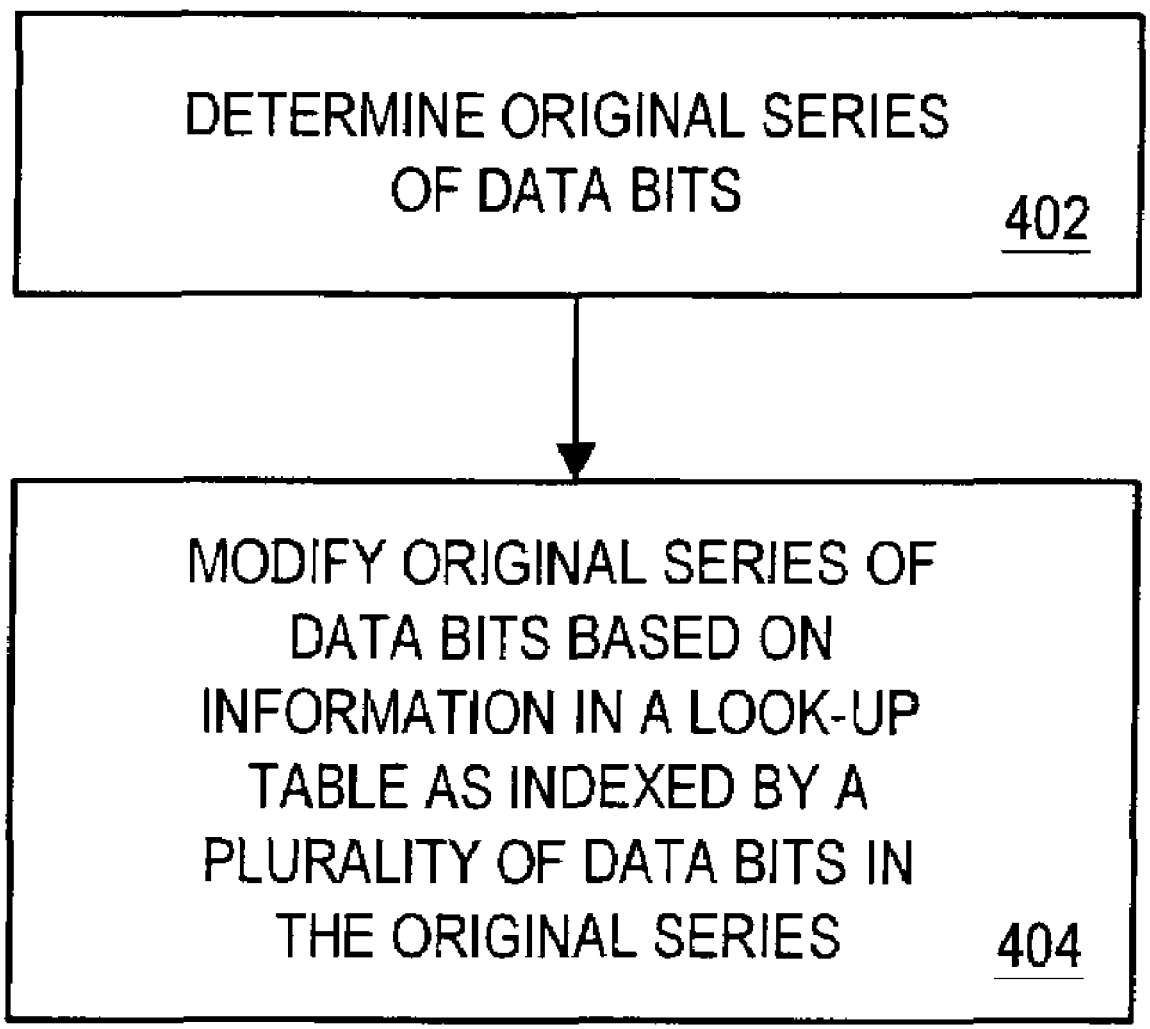
FIG. 4 is a flow chart of a method according to some embodiments.

FIG. 4 is a flow chart of a method according to some embodiments. The flow charts described herein do not necessarily imply a fixed order to the actions, and embodiments may be performed in any order that is practicable. The method may be performed, for example, by the bit stuffing unit 310 of FIG. 3.

At 402, an original series of data bits is determined. The original series of data bits may comprise, for example, a PDU packet to be encapsulated within an HDLC frame structure.

At 404, the original series of data bits is modified based on information in a look-up table as indexed by a plurality of data bits in the original series. For example, the bit stuffing unit 310 may use four data bits in the original series as an index to access information in the look-up table 320. The bit stuffing unit 310 may then retrieve from the look-up table 320 a modified bit pattern to be included in a modified series of data bits. According to some embodiments, the information in the look-up table 320 further includes an indication of a number of data bits in the modified bit pattern. For example, when four data bits in the original series are used as an index, the modified bit pattern might contain four data bits that will be included in the modified series of data bits (i.e., no extra data bit has been inserted). The modified bit pattern might instead contain additional data bits (i.e., when one or more extra data bits have been inserted).

According to some embodiments, the information in the look-up table further includes an updated ones counter, and information in the look-up table is further indexed by a current ones counter. Of course, a zeros counter would be used instead when searching for a pattern of consecutive zeros.

Note that any of the methods described herein may be performed by hardware, software (including microcode), or a combination of hardware and software. For example, a medium may store instructions adapted to be executed by a processor to receive an original series of data bits and to modify the original series of data bits based on information in a look-up table as indexed by a plurality of data bits in the original series.

Look-Up Table

FIG. 5 illustrates entries in a look-up table according to some embodiments. In particular, this look-up table can be used to prevent a series of six ones from occurring in a modified series of data bits. Note that although a particular arrangement of information is shown in FIG. 5, information may instead be stored in another arrangement.

Each entry in the look-up table is indexed by a bit pattern comprising a current ones counter 504 and an original bit pattern 506, associated with a serial number 502 for reference. The original bit pattern 506 represents four bits in the original stream of data bits. The current ones counter 504 reflects the number of consecutive ones that occurred immediately prior to those four bits in the original series.

Based on the current ones counter 504 and the original bit pattern 506, the modified bit pattern 512 can be efficiently determined along with the number of data bits in the modified bit pattern 508. In FIG. 5, underlined and bolded bits in the modified bit pattern 512 indicate invalid bits (i.e., the first bit is invalid when the associated number of data bits in the modified bit pattern 508 is only four). Similarly, an updated ones counter 510 can be determined based on the current ones counter 504 and the original bit pattern 506.

Consider the first entry (associated with serial number 1) in the look-up table (i.e., the original bit pattern 506 is "0000" and no consecutive ones were present immediately prior to those four bits in the original series). The modified bit pattern 512 remains "0000" (i.e., no zero is inserted), and the updated ones counter 510 remains "000" (i.e., no consecutive ones occur immediately prior to the next four data bits in the original series).

Now consider the second entry (associated with serial number 2) in the look-up table (i.e., the original bit pattern 506 is "0001" and no consecutive ones were present immediately prior to those four bits in the original series). The modified bit pattern 512 remains "0001" (i.e., no zero is inserted), but the updated ones counter 510 is now "001" (i.e., because a single one will occur immediately prior to the next four data bits in the original series).

Consider now the entry wherein the original bit pattern 506 is "1111" and three consecutive ones were present immediately prior to those four bits in the original series (associated with serial number 64). The modified bit pattern 512 becomes "11011" (i.e., the zero was inserted and the pattern includes five bits). Moreover, the updated ones counter 510 is now "010" (i.e., because a pair of ones will occur immediately prior to the next four data bits in the original series).

The look-up table may also be arranged as a table having six rows, each row being associated with a potential current ones counter value (i.e., zero through five). Each row in the table may have sixteen columns, each column being associated with a potential value of the four data bits in the original series (i.e., zero through fifteen). Moreover, each position in the table may include eleven bits of information as follows, with $b_0$ representing the Least Significant Bit (LSB): $b_0$ through $b_4$ representing the modified bit pattern, $b_5$ through $b_7$ representing the updated ones counter, and $b_8$ through $b_{10}$ representing the number of data bits in the modified bit pattern. In this case, the six rows may include the following information (the prefix "0x" represents hexadecimal numbering):

Current Ones Counter=0: 0x0400, 0x0421, 0x0402, 0x0443, 0x0404, 0x0425, 0x0406, 0x0467, 0x0408, 0x0429, 0x040a, 0x044b, 0x040c, 0x042d, 0x040e, 0x048f;

Current Ones Counter=1: 0x0400, 0x0421, 0x0402, 0x0443, 0x0404, 0x0425, 0x0406, 0x0467, 0x0408, 0x0429, 0x040a, 0x044b, 0x040c, 0x042d, 0x040e, 0x04af;

Current Ones Counter=2: 0x0400, 0x0421, 0x402, 0x0443, 0x0404, 0x0425, 0x0406, 0x0467, 0x0408, 0x0429, 0x040a, 0x044b, 0x040c, 0x042d, 0x051c, 0x053d;

Current Ones Counter=3: 0x0400, 0x0421, 0x0402, 0x0443, 0x0404, 0x0425, 0x0406, 0x0467, 0x0408, 0x0429, 0x040a, 0x44b, 0x0518, 0x0539, 0x051a, 0x055b;

Current Ones Counter=4: 0x0400, 0x0421, 0x0402, 0x0443, 0x0404, 0x0425, 0x0406, 0x0467, 0x0510, 0x0531, 0x0512, 0x0553, 0x0514, 0x0535, 0x0516, 0x0577; and Current Ones Counter=5: 0x0500, 0x0521, 0x0502, 0x0543, 0x0504, 0x0525, 0x0506, 0x0567, 0x0508, 0x0529, 0x050a, 0x054b, 0x050c, 0x052d, 0x050e, 0x058f.

EXAMPLE

Figure 6:
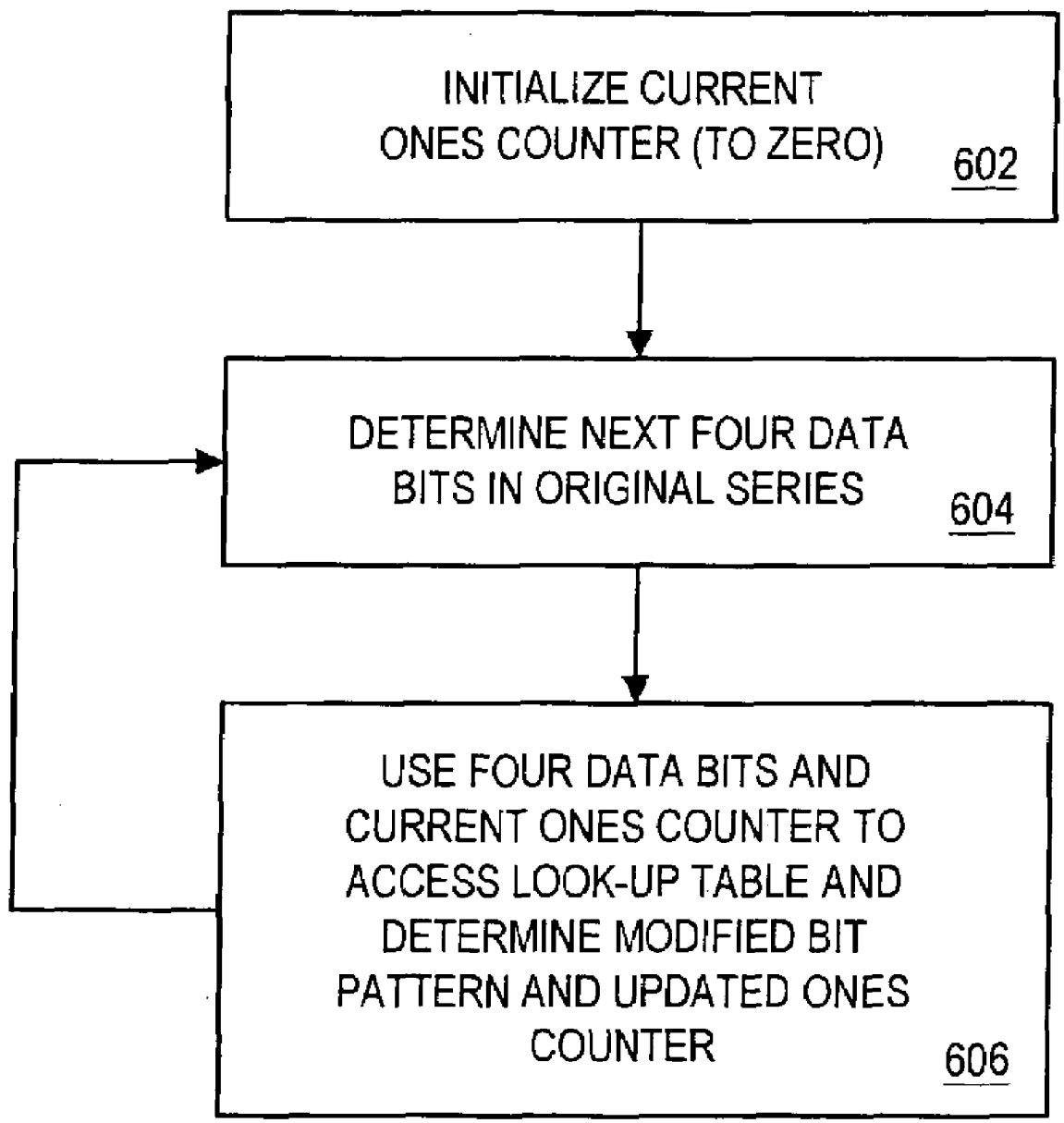
FIG. 6 is a flow chart of a method according to some embodiments.

FIG. 6 is a flow chart of a method according to some embodiments. At 602, a current ones counter is initialized. Although a ones counter is described herein, note that the counter may instead be associated with another bit value (e.g., either a zero or a one) or bit pattern.

At 604, the next four data bits in the original series are determined. These four data bits and the current ones counter are then used to access the look-up table and determine a modified bit pattern at 606 (i.e., containing four or five bits as appropriate). An updated ones counter is also determined at 606 and the process continues at 604.

Because four data bits are evaluated at once, and information stored in the look-up table is used to determine the modified bit pattern and updated ones counter, the bit stuffing operation may be performed efficiently. Moreover, the code required to perform such operations may be used for various types of processors and/or protocols. For example, the following algorithm may be used to implement the operation:

```
for (i = 0; i < 2; i++, iByte >>4)
{
    index = (OnesCounter << 4)|(iByte & 0x0F);
    Temp16 = EcmHdlc_Remod_Table[index];
    NoutBits = (Temp16 >> 8) & 0x07;
    OneCounter = (Temp16 >> 5) & 0x07;
    Mask = ~(0xffffffff << NoutBits);
    DataOut = (Word32)(Temp16) & Mask;
    NewWord32 = NewWord32 | (DataOut << cur_pos–NoutBits));
    pw16Out[BitCounter >> 4] = (Word16)(NewWord32 >>16 );
    BitCounter = BitCounter + NoutBits;
    cur_pos = cur_pos – NoutBits;
}
```

Figure 7:
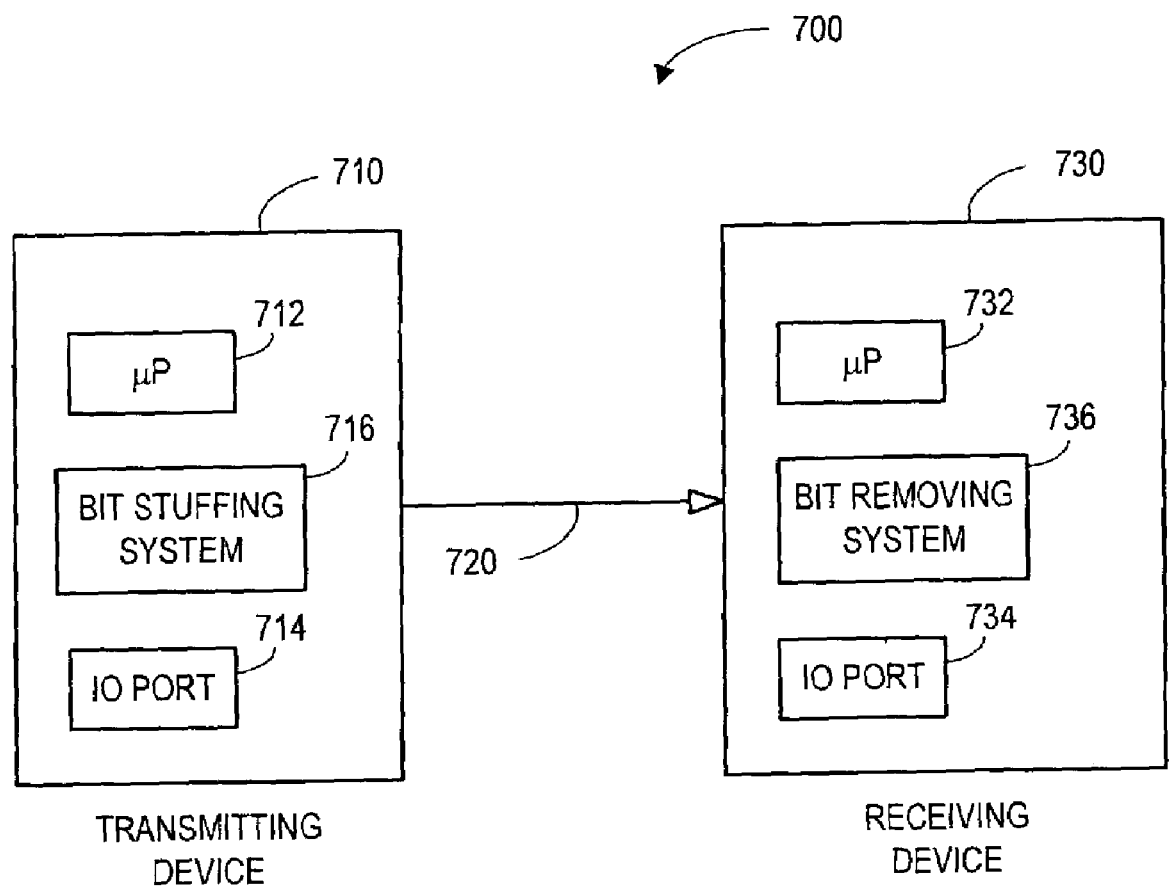
FIG. 7 is a block diagram of a system including a transmitting device according to some embodiments.

Note that the EcmHdlc_Remod_Table in the algorithm references the table with six rows and sixteen columns previously described. Moreover:
= indicates an assignment,
& indicates a bitwise logical AND operation,
| indicates a bitwise logical OR operation,
<< indicates a bitwise left shift with zero bit insertion, and
>> indicates a bitwise right shift with zero bit insertion.
System FIG. 7 is a block diagram of a system 700 including a transmitting device 710 according to some embodiments. In this case, the transmitting device 710 has an original series of data bits to be provided to a receiving device 730 via a communication path 720 (e.g., associated with a network). The transmitting device 710 also includes a microprocessor 712, such as a microprocessor 712 to execute a media application that provides information to the receiving device 730. The transmitting device 710 further includes an Input Output (IO) port 714 through which information may be transmitted. Similarly, the receiving device 730 includes a microprocessor to execute a media application that receives information from the transmitting device 710 via an IO port 734.

The transmitting device 710 also includes a bit stuffing system 716 in accordance with any of the embodiments described here (e.g., as described with respect to FIGS. 3 through 6). The bit stuffing system 716 may, for example, include a bit stuffing unit to modify an original series of data bits based on information in a look-up table as indexed by a plurality of data bits in the original series. The receiving device 730 may also include a bit removing system 736 (e.g., to remove zeros inserted by the bit stuffing system 716).

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Some embodiments have been described wherein additional bits (either zeros or ones) are inserted into a series of data bits. Similar embodiments may be used to remove additional bits from a series of data bits. For example, a receiving device may include a storage device to store a look-up table. The receiving device may further include a bit removing unit to modify a series of received data bits based on information in the look-up table as indexed by a plurality of data bits in the received series (e.g., the look-up table may include a modified bit pattern to be included in a modified series of data bits).

Moreover, although particular patterns of bits have been described herein as examples (e.g., "0111 1110"), embodiments may be used with other patterns. Similarly, a look-up table may be accessed using fewer data bits from an original series (e.g., two data bits) or more data bits (e.g., eight data bits). Increase the number of data bits used to access the look-up table, of course, may increase the size of the look-up table.

In addition, although particular protocols have been described herein as examples, embodiments may be used with other protocols, such as the X.25 protocol as defined by the International Telecommunications Unit (ITU) in the recommendation entitled "Interface Between Data Terminal Equipment (DTE) and Data Circuit-Terminating Equipment for Terminals Operating in the Packet Mode and Connected to Public Data Networks by Dedicated Circuits" (October 1996). Similarly, embodiments may be used with protocols that require a fixed-size frame (e.g., and data bits are inserted to make a frame the appropriate size) or protocols that require a continuous stream of data (e.g., and zero bits are sometimes inserted to ensure that a stream is not broken).

The several embodiments described herein are solely for the purpose of illustration. Persons skilled in the art will recognize from this description other embodiments may be practiced with modifications and alterations limited only by the claims.

What is claimed is:

1. A method, comprising:
   determining an original series of data bits;
   retrieving data from a look-up table using an index comprising a current ones counter and the original series of data bits, wherein the retrieved data from the table includes (i) a modified bit pattern, (ii) a number of data bits in the modified bit pattern, and (iii) a value representing an updated ones counter;
   outputting the modified bit pattern; and
   repeating said determining, retrieving, and outputting using the updated ones counter as the current ones counter.

2. The method of claim 1, wherein the modified bit pattern is associated with at least one of: (i) a high level data link control protocol, (ii) a service data unit, (iii) a protocol data unit, (iv) a voice over packet device, or (v) a public switched telephone network device.

3. The method of claim 2, wherein the look-up table is associated with at least one of: (i) a read only memory unit, (ii) a programmable read only memory unit, or (iii) an erasable programmable read only memory unit.

4. The method of claim 2, wherein said outputting is associated with at least one of: (i) voice information, or (ii) fax information.

5. The method of claim 1, wherein said retrieving is to prevent a pre-determined pattern of data bits from occurring in the output modified bit pattern.

6. An apparatus, comprising:
- a storage device to store a look-up table, the look-up table being indexed by a current ones counter and an original series of data bits, wherein for each index the look-up table stores (i) a modified bit pattern, (ii) a number of data bits in the modified bit pattern, and (iii) a value representing an updated ones counter; and
- a bit stuffing unit to modify an input series of data bits based on information in the look-up table.

7. The apparatus of claim 6, wherein the bit stuffing unit is to prevent a pre-determined pattern of data bits from occurring in an output series of data bits.

8. The apparatus of claim 7, wherein the pre-determined pattern of data bits is a flag pattern.

9. The apparatus of claim 8, wherein the flag pattern is a high level data link control frame flag pattern.

10. The apparatus of claim 6, wherein the storage device is a memory unit.

11. The apparatus of claim 6, further comprising:
- an output port to transmit an output series of data bits.

12. A medium storing instructions adapted to be executed by a processor to perform a method, said method comprising:
- receiving an original series of data bits;
- retrieving data from a look-up table using an index comprising a current ones counter and the original series of data bits, wherein the retrieved data from the table includes (i) a modified bit pattern, (ii) a number of data bits in the modified bit pattern, and (iii) a value representing an updated ones counter;
- outputting the modified bit pattern; and
- repeating said determining, retrieving, and outputting using the updated ones counter as the current ones counter.

13. The medium of claim 12, wherein said modifying is to prevent a pre-determined pattern of data bits from occurring in a modified series of data bits.

14. The medium of claim 13, wherein the pre-determined pattern of data bits is a flag pattern.

15. The medium of claim 14, wherein the flag pattern is a high level data link control frame flag pattern.

16. The medium of claim 12, wherein said method further comprises:
- accessing the look-up table via a storage device.

* * * * *